United States Patent [19]

Flotow et al.

[11] Patent Number: 4,566,572
[45] Date of Patent: Jan. 28, 1986

[54] CLUTCH WITH A PILOTED AND SPRING LOADED DRIVEN DISC HUB

[75] Inventors: Richard A. Flotow, Butler; William M. Tennant, Auburn, both of Ind.

[73] Assignee: Dana Corporation, Toledo, Ohio

[21] Appl. No.: 569,362

[22] Filed: Jan. 9, 1984

[51] Int. Cl.⁴ .................... F16D 25/061; F16D 13/72
[52] U.S. Cl. .............................. 192/70.12; 192/70.28; 192/85 AA; 192/113 B
[58] Field of Search ................ 192/70.12, 70.2, 70.28, 192/85 A, 85 AA, 113 B

[56] References Cited

U.S. PATENT DOCUMENTS

| | | | |
|---|---|---|---|
| 1,617,717 | 2/1927 | Lombard | 192/70.2 X |
| 3,145,816 | 8/1964 | DeLorean et al. | 192/113 B X |
| 3,157,257 | 11/1964 | Root | 192/18 A |
| 3,202,253 | 8/1965 | Merritt et al. | 192/85 AA X |
| 3,249,189 | 5/1966 | Schjolin et al. | 192/70.12 |
| 3,667,583 | 6/1972 | Richards | 192/105 A |
| 3,744,608 | 7/1973 | Newman | 192/105 A |
| 3,804,219 | 4/1974 | Cummings | 192/82 T |

*Primary Examiner*—Rodney H. Bonck
*Assistant Examiner*—Richard M. Lorence
*Attorney, Agent, or Firm*—Harold D. Shall

[57] ABSTRACT

A multiple disc clutch has a multiple component clutch housing which is adapted for oil lubricating and cooling of the clutch discs and plates during operation. Concentric driven shafts extend into the clutch housing from the rearward end thereof with the inner shaft extending into a driving relation with a counter bore in the forward component of the clutch housing. The outer shaft has a splined outer end on which is drivingly mounted the driven disc hub. The forward end of the hub is piloted in a recess in the forward component of the clutch housing, and a wave washer reacting against another portion of the clutch housing biases the driven disc hub into piloting engagement within the recess. On the driven disc hub are drivingly mounted the driven discs; the latter being interleaved with the driving plates of the clutch. Both the discs and the plates are disposed within the clutch housing. Cooling and lubricating fluid passages are present through the outer shaft and through and around the driven disc hub so that the fluid can reach the discs and plates. A piston in the clutch housing is operated by fluid pressure to cause clutch engagement.

19 Claims, 3 Drawing Figures

CLUTCH WITH A PILOTED AND SPRING LOADED DRIVEN DISC HUB

BACKGROUND OF THE INVENTION

This invention relates to clutches for location between a driving engine and a transmission and more particularly to a transmission having a plurality of friction plates and disc with a clutch cooling and lubricating system.

Many clutches of the above general nature are known in the prior art, and are included under the general description of an oil cooled clutch. Cooling such a clutch requires passages for the cooling fluid which are arranged to deliver the fluid to all portions of the friction surfaces in a manner which does not starve one location while delivering excess fluid to other locations.

One such method is merely to immerse the clutch in a circulating bath of oil. Another method is to provide passages through which oil is pumped to desired locations and then recirculated from the clutch; however, these structures do not necessarily adequately lubricate all the necessary clutch parts in addition to the clutch discs and plates. It is very desireable that the hub, which mounts and is driven by the friction discs and which is driven when the clutch is engaged, be piloted so that the shaft, which is driven by the hub, can be originally installed in the hub in a simple manner and if the shaft is withdrawn from the clutch assembly, such should be done without the hub losing its position within the clutch assembly. The shaft should be able to be simply reinserted into the clutch assembly and into the hub. This piloting must be lubricated to prevent wear, and since lubrication to the clutch friction members is desireably passed through and around the hub, it is also desireable that the position of the hub be piloted relative to other clutch members and that the piloting contact be resiliently controlled. Adequate piloting and resilient control of the piloting engagement in the manner contemplated by this invention is not present in the prior art.

SUMMARY OF THE INVENTION

In the present invention, the clutch cover assembly is made of a plurality of components, the forward component (forward being the direction toward the engine driven flywheel and rearward being toward the transmission driven by the clutch) thereof being piloted in the flywheel and the rearward face of the forward component has a recess therein. The front end of the clutch hub has oil channels therein and is received in this recess, and a wave washer engages the rear end of the clutch hub to bias the front end thereof of the recess while the periphery of the recess engages the forward periphery of the hub; the wave washer reacts against a forwardly facing surface of another clutch component. The wave washer controls the degree of engagement between the hub and the wall of the recess. Thus the size of the oil channels in the front end of the hub is controlled, and even though the hub can momentarily move rearwardly under the urging of the driven discs during clutch disengagement, the wave washer will reposition the hub relative to the recess wall and control the piloting engagement. Since a wave washer is being used, oil can also flow past the rear end of the hub to lubricate its engagement with the wave washer and also move radially outwardly past the wave washer to lubricate the plates and discs.

DESCRIPTION OF THE PREFERRED EMBODIMENT

Figure 1:
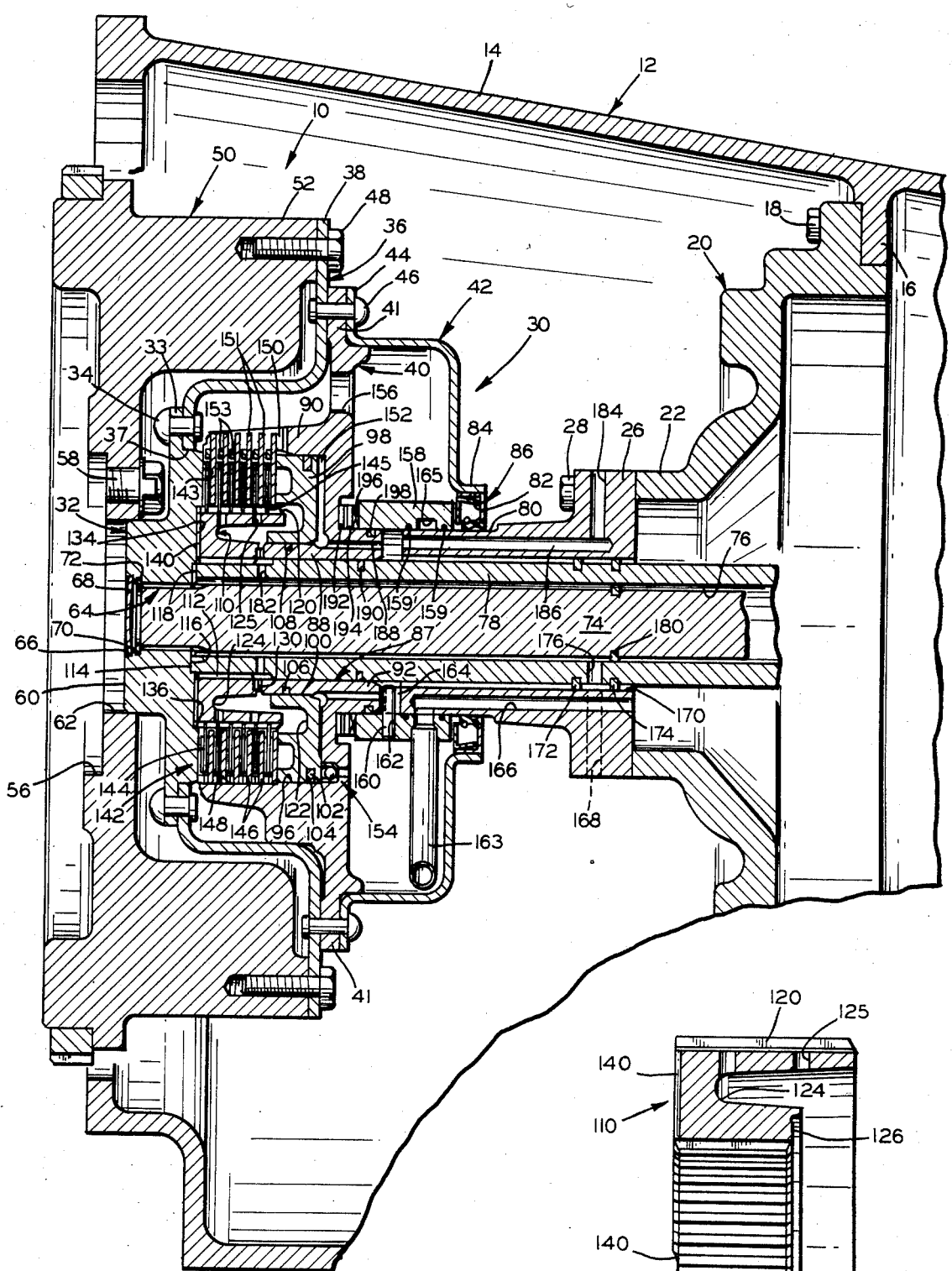
FIG. 1 is a longitudinal cross-sectional view of a clutch embodying this invention in conjunction with a portion of an accompanying flywheel and a portion of an accompanying transmission; some parts being shown in full lines for added clarity.

Referring to FIG. 1, a clutch assembly embodying this invention is shown generally at 10 and is for use with a transmission, the forward end of the housing thereof being shown fragmentarily at 12 and having a portion 14 of the housing which surrounds the clutch 10.

An internal annular shoulder 6 in the housing 12 has mounted thereto, as by a plurality of circumferentially spaced mounting bolts 18, a forwardly extending annular housing 20 which is necked down at its forward end 22 to have mounted thereto a non-rotating annular housing 26 as by a plurality of bolts 28. Further details of the housing 26 will be explained hereinafter.

The clutch assembly 10 has a multiple component clutch cover 30 consisting of an annular forward or piloting member 32 in the form of a first clutch portion having an annular shoulder 33 extending radially outwardly, which shoulder 33 is riveted by a plurality of circumferentially spaced rivets 34 in a sealed relationship to an annular mounting bracket 36 which is dish shaped and concave when viewed from the right, with a peripheral annular flange 38 formed integral therewith. The bracket 36 has a bore 37 in which is received the forward annular end of the piloting member 32.

The cover 30 also includes an annular bracket cylinder 40 which comprises the second clutch portion having an annular radially outwardly extending shoulder portion 41 positioned to the right of the annular flange 38, but terminating radially inwardly of the flange 38. The final component of the clutch cover 30 is a scavenger ring bracket 42, which is concave when viewed from the left, and has a annular peripheral flange 44 abutting the right side of and being of equal radial size as the shoulder 41. The flange 44, the shoulder 41 and the flange 38 are sealingly secured together by a plurality of circumferentially spaced rivets 46.

The annular flange 38 of the mounting bracket 36 is drivingly secured as by a plurality of circumferentially spaced bolts 48 to a rearwardly projecting annular shoulder 52 on the engine driven flywheel 50; the flywheel being received in the left end of the transmission housing 12. A centrally positioned counter bore 56 in the left face of flywheel 50 is adapted to receive the end of an engine crank shaft (not shown) to which the flywheel would be secured by a plurality of bolts, one of which is shown fragmentarily at 58.

The piloting member 32 of the clutch cover 30 has a centrally located annular shoulder 60 projecting forwardly therefrom into a bore 62 in the flywheel 50 to pilot the clutch cover 30 and thereby the entire clutch assembly 10, to insure coaxial alignment of the clutch assembly and the flywheel.

The piloting member 32 has an axially extending central bore 64 therein. The left or outer end of the bore 64 has a short portion 66 which is larger in diameter than the remainder of the bore and receives therein an expansion plug 68 which seals the left end of the clutch cover assembly 30. To the right of short portion 66 is a snap ring groove 70 which receives a snap ring 72 that acts as an abutting shoulder. The remainder of the bore 64, to the right of the snap ring 72 is internally splined and receives the forward externally splined end of a power-take-off drive shaft 74, so that the shaft 74 rotates unitarily with the flywheel 50 and cover 30. The left end of shaft 74 abuts the snap ring 72. The drive shaft 74 is disposed coaxially with and located centrally within a bore 76 in the transmission input shaft 78.

As previously described, there is a non-rotating housing 26 attached to the forward end 22 of the annular housing 20. The housing 26 has an elongated annular neck 80 which extends forwardly into the scavenger ring bracket 42. A central aperture 82 in the bracket 42 has a rearwardly extending annular lip 84 which is spaced from the neck 80. Pressed in the aperture 82 is the metallic peripheral surface of an oil seal assembly 86, with the rubber lip sealing portion of the assembly 86 engaging the periphery of the neck 80. Thus, the front end of the clutch cover 30 is sealed by the piloting member 32, with its central expansion plug, while the right end of the cover 30 is sealed by the oil seal assembly 86.

The bracket cylinder 40 has a central bore 87 therein and from the radially extending portion 41 of the bracket cylinder, a pair of radially spaced axially extending annular hubs 88 and 90 extend forwardly of the portion 41 and an axially extending annular hub 92 extends rearwardly thereof. More particularly, the annular hub 88 surrounds the forward portion of the central bore 87 and is slightly spaced from and rotatable relative to the periphery of shaft 78; the hub 88 extending about halfway from the radially extending portion 41 of the bracket cylinder 40 toward the rearward face of the piloting member 32. The annular hub 90 is spaced radially outwardly of the hub 88 and extends to be adjacent to the radially outer edge of an abutting face 143 formed on the right side of the piloting member 32.

The hub 90 has a first bore 96 formed at the right side thereof, which bore 96 receives the periphery of a piston 98, while the piston 98 has a central bore 100 which is slidably received on the periphery of the annular hub 88. A piston ring 102 is received in a groove 104 formed in the periphery of piston 98 and sealingly engages the bore 96, while a piston ring 106 received in a groove 108 formed in the periphery of the hub 88 sealingly engages the central bore 100 of the piston 98.

Figure 2:
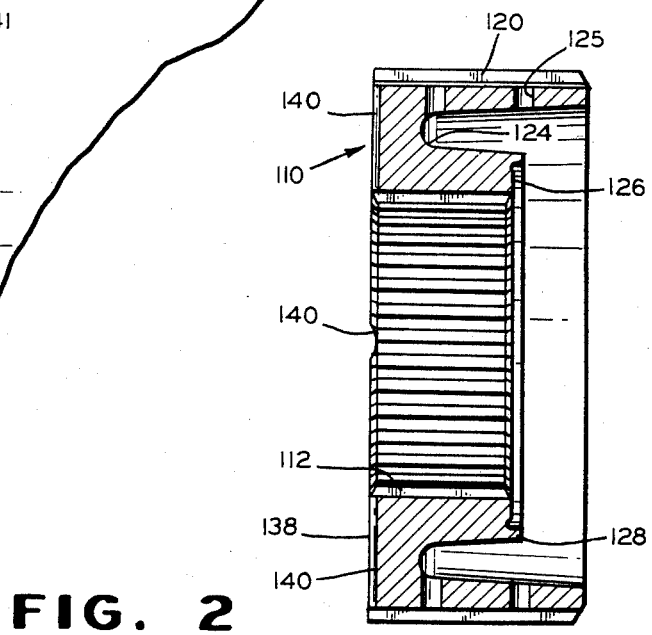
FIG. 2 is a longitudinal cross-sectional view of the driven disc hub of the clutch shown in FIG. 1.

Referring to FIGS. 1 and 2, a clutch driven hub 110 is disposed generally in the space between the piloting member 32 to the left thereof and on the right of the driven hub 110 is the piston 98 and the annular hub 88 on the bracket cylinder 40. The clutch driven hub 110 has a central axially extending splined bore 112, which receives the splined forward end of the transmission input shaft 78, while the left outer end 114 of the shaft 78 abuttingly engages an abutting surface 116 formed on the right side of the piloting member 32 immediately radially outwardly of the central bore 64 therein. A plurality of radially extending circumferentially spaced grooves 118 in the left end 114 of the shaft 78 provide a path for oil to pass between the end of the shaft and the abutting surface 116 of the pilot member 32 to lubricate this abutting relationship and also to flow outwardly to lubricate and cool the other clutch parts as hereinafter more fully described.

The clutch driven hub 110 has a splined periphery 120 which periphery extends further to the right than the splined bore 112 thereof; the piston 98 having an annular relief groove 122 formed in the left side thereof to accommodate the splined periphery of the hub 110. The driven hub 110 has an annular groove 124 formed in the right side thereof between the splined bore portion 112 and the splined peripheral portion 120 to provide an annular access path for lubricant to flow into the groove 124 and radially outwardly through two axially spaced rows of circumferentially spaced holes 125 extending from the groove 124 and radially out of the splined periphery 120 of the driven hub 110.

The right face of the driven hub 110 surrounding the splined bore therein has an annular piloting groove 126 (see FIG. 2 for groove details) formed therein, which groove defines a radially outer abutting shoulder 128 of the grooves 126. Disposed in the groove 126 is an axially acting annularly shaped compression spring in the form of an annular resilient spring washer such as a wave washer 130 which has a portion thereof extending to the right out of the groove 126 and engaging and compressed against the left end of the annular hub 88, which is another portion of said clutch cover of said clutch assembly, to thereby bias the clutch driven hub 110 to the left. The abutting shoulder 128 of the groove 126 pilots the wave washer 130 and prevents the latter from moving radially.

The left face of the clutch driven hub 110 is received within an annular piloting bore 134 or pilot mass formed on the right side of the piloting member 32, or pilot means which bore is located immediately radially outwardly of the abutting surface 116 formed in the piloting member 32. The annular bore 134 terminates at an annular shoulder 136 around the periphery of the bore 134. Into abutting engagement with the bore 134 is biased the left face or abutting end 138 of the driven hub 110, while the annular shoulder 136 abuts and pilots the periphery at the left end of the hub 110 thereby piloting the radial location of the hub 110.

A plurality of radially extending and circumferentially spaced grooves 140 (three of which are seen in FIG. 2) are formed in the left face 138 of the driven hub 110; the grooves extending from the root of the splines in the bore 112 to the root of the peripheral splines 120, to provide a path for fluid to lubricate the engagement between the left hub face 138 and the bore 134 of the piloting member and also to flow outwardly to lubricate and cool the other clutch parts as hereinafter more fully described. The wave washeer 130 also allows lubricant to flow between the right end of the driven hub 110 and the left end of the annular hub 88 to lubricate the engagement between the wave washer 130 and these hubs as the hubs 88 and 110 may rotate relatively during certain stages of clutch operations, and also to lubricate and cool other clutch components. While a dished washer spring, also known as a Belleville spring could bias the driven hub 110, it would prevent the desired passage of lubricant. However, other lubricant passing angular springs which are axially compressible could be utilized; such as, but not limited to tang washers or slotted or perforated Belleville springs.

Figure 3:
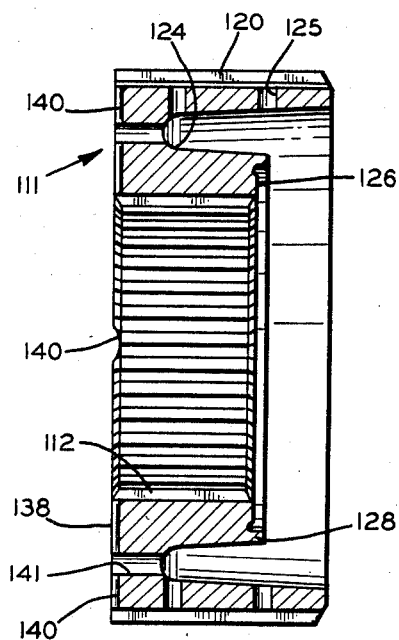
FIG. 3 is a longitudinal sectional view of another embodiment of a driven disc hub for use in this invention.

In FIG. 3, another embodiment of a driven hub is shown at 111. Like parts of the driven hub 111 will be numbered the same in FIG. 3 as they were with respect to the driven hub 110.

The only difference between the hubs 110 and 111 is that the hub 111 has a plurality of axial grooves 141 therein, which grooves extend axially from the groove 124 and terminate at the bottom of the radially extending grooves 140, there being one groove 141 for each groove 140, to provide for additional flow of lubricant to lubricate the left hub face 138 and also to flow past the face 138 and outwardly lubricate and cool other clutch parts.

Disposed between the annular hubs 88 and 90 and between the piston 98 and the annular abutting face on the piloting member 32 is a clutch disc pack 142. More particularly, six annular driven discs 144, having annular friction surfaces on their axially opposed faces and each having a splined bore 145, are splined on and carried by the splined periphery 120 of the clutch driven hub 110. Interleaved with the driven discs 144 are six annular intermediate plates 146. The intermediate plates 146 are larger in diameter than the driven discs 144 and are piloted radially within the bore 148 of the annular hub 90. The hub 90 has a plurality of axially extending and circumferentially spaced slots 150 formed therein, and each plate 146 has a like plurality of tangs 151 projecting therefrom into driving registration with an adjoining slot in the hub 90 in a conventional manner. Thus, the plates 146 being some members of the pack rotate with the hub 90 while the driven discs 144 being other members of the pack rotate with the driven hub 110. Six wave washers 153 are also present in the disc pack 142. The wave washers 153 are larger in diameter than the driven discs 144 and are disposed peripherally thereof; five of these washers being between adjacent intermediate plates 146 while the sixth is between the left plate and the piloting member 32. The wave washers 153 insure plate separation when the clutch 10 is disengaged, and because they have a wave washer shape, do not inhibit the passage of lubricant past the same.

In the portion of clutch 10 in FIG. 1 above the axial centerline of the clutch, the piston 98, which is the means for causing clutch engagement, is shown moved to its left or clutch engaging position by the action of pressurized fluid present in a chamber 152 disposed between the right side of the piston 98 and the bracket cylinder 40 between its annular hubs 88 and 90. In the portion of FIG. 1 below the axial centerline of the clutch 10, the piston 98 is shown moved to the right by the action of the wave washers 153 upon pressurized fluid being discharged from the chamber 152. A quick dump valve 154 is shown in the wall of the bracket cylinder 40 and confluent with the radially outer end of the chamber 152 to expedite the discharge of the fluid from the chamber 152 in a well known manner.

Formed through the bracket cylinder 40 radially outwardly of the hub 90 but radially inwardly of the scavenger bracket 42 and the mounting bracket 36 is a plurality of axially extending, circumferentially spaced oil passages 156 to allow oil that has been discharged past the clutch disc pack 142 to reach the confines of the scavenger ring bracket 42.

Rotatably mounted on the rightwardly extending hub 92 of the bracket cylinder 40 is the forward end of an annular stationary ring 158; the right end of the stationary ring being mounted on the left end of the stationary annular neck 80 and secured against rotation relative thereto by a pin 160 which passes through a hole 162 in the ring 158 and engages a slot 164 in the left end of the annular neck 80. Mounted in the stationary ring 158 is a stationary pilot pick up tube 163. Upon rotation of the clutch cover 30 and thereby rotation of the scavenger ring 42, oil is carried against the pitot tube and through the latter to an annular passageway 165 formed in the bore of the stationary ring 158. A pair of axially spaced o-rings 159,159'; one disposed in the ring 158 on each axial side of the passageway 164, engage and seal against the neck 80. The passageway 165 leads to a passageway 166 formed in the neck 80 and leading rearwardly therefrom to the transmission where it is filtered and pumped back to the clutch for cooling and lubricating the same.

Oil for cooling and lubricating the clutch 10 enters the annular neck 80 through the radially extending passageway 168 shown in dotted lines in FIG. 1, which passageway 168 leads to the bore 170 of the neck 80. The transmission input shaft 78 is mounted for rotation in the bore 170 in the neck 80 with a space between the shaft and the bore. A pair of axially spaced piston rings 172 and 174 are sealingly mounted in the periphery of the input shaft 78 and rotatably sealingly engage the bore 170, one on each axial side of the passageway 168. In the wall of the input shaft 78 is a radially extending passageway 176 which leads to the hollow bore 76 of the input shaft in which latter hollow bore is mounted the power-take-off drive shaft 74 in spaced relationship to the bore 76.

A piston ring 180 is sealingly located in a groove in the power-take-off shaft 74 and rotatably sealingly engages the bore 76 of the transmission input shaft 78 to the right of the passageway 176. The transmission input shaft 78 has a plurality of radially extending passageways 182 at the location of the wave washer 130. Cooling oil, after entering at passageway 168 flows through passageway 176, then forwardly between the power-take-off shaft 74 and the transmission input shaft 78 and then radially outwardly through the passageways 182 in the shaft 78 and through the passageways in the end of the input shaft 78 in the form of the grooves 118. The oil then flows radially outwardly past the wave washer 130 and out to the disc pack 142 around the right end of the driven hub 110 and through the holes 125 in the splined periphery of the hub 110 and also flows radially outwardly to the disc pack through the grooves 118 at the end of the shaft 78 and then through the grooves 140 in the left end of the driven hub 110.

The wave washer 130 not only allows oil to pass therethrough while controlling the engagement of the hub 110 with the pilot member 32, but also, if the driven discs 144 hang up on the driven hub 110 and push it momentarily to the right, the wave washer 130 will bias it back to its proper position.

Clutch engagement fluid from the control valve (not shown) enters the clutch through the passageway 184 on the non rotating housing 26, then through passageway 186 in the neck 80, then through a passageway 188 formed in the annular hub 92 of the bracket 40 and into the chamber 152 to the right of the piston 98. A piston ring 198 is sealingly carried in a groove in the periphery of the hub 92 and sealingly engages the inner surface of the stationary ring 158, while a piston ring 190, sealingly carried in a groove in the external surface of the input shaft 78, sealingly engages the internal surface of the annular hub 92 to confine the clutch actuating fluid to the desired path.

Disposed between the left side of the stationary ring 158 and the right side of the bracket cylinder 40 is a bearing assembly, comprising, from left to right, a wave washer 192, a thrust washer 194, and a thrust bearing 196 to facilitate relative rotation between the bracket cylinder 40 and the stationary member 158, while the biasing thrust of the wave washer keeps the pin 160 biased into the slot 164.

What is claimed is:

1. A clutch for drivingly connecting an engine driveable flywheel to the input of a transmission, the flywheel direction being considered forward and the transmission direction being considered rearward, comprising a multiple component clutch cover assembly with the forward one of said cover components being adapted to be piloted by the flywheel, said clutch cover assembly surrounding a clutch pack comprised of clutch plates drivingly connected to said clutch cover and clutch discs interleaved with said clutch plates, a clutch driven hub disposed in said clutch cover assembly and drivingly connected to said clutch discs, means carried by said clutch cover assembly for causing engagement of said clutch pack, pilot means carried by the rear portion of said forward cover component with the foward end of said clutch driven hub pilotingly engaging said pilot means, and a resilient means engaging a rear surface of said clutch driven hub and reacting between the latter and another portion of said clutch assembly for biasing said clutch driven hub into piloting engagement with said pilot means.

2. A clutch according to claim 1 wherein said pilot means comprises an annular bore in the rearward portion of said forward clutch component, which annular bore defines an annular peripheral shoulder and the forward end of said clutch driven hub is received in said annular bore with said annular shoulder pilotingly engaging the periphery of said hub.

3. A clutch according to claim 1 wherein said resilient means is an annular resilient spring washer including means therein for allowing lubricant to flow radially therethrough.

4. A clutch according to claim 3 when said spring washer is a wave washer.

5. A clutch according to claim 2 wherein said resilient means is an annular resilient spring washer including means for allowing lubricant to flow radially therethrough.

6. A clutch according to claim 1 wherein said clutch driven hub has a forward end face and has radially extending lubricant passage means formed in said forward end face.

7. A clutch according to claim 2 wherein said annular bore has an abutting surface formed on the front end of said bore, the forward end of said clutch driven hub engages said abutting surface, and said forward end of said hub has a plurality of circumferentially spaced radially extending lubricant passages therein.

8. A clutch according to claim 5 wherein said annular bore has an abutting surface formed on the front end of said bore, the forward end of said clutch driven hub engages said abutting surface, and said forward end of said hub has a plurality of circumferentially spaced radially extending passages therein.

9. A clutch for drivingly connecting an engine drivable flywheel to the input of a transmission, the flywheel direction being considered forward and the transmission direction being consiered rearward, comprising a first clutch portion adapted to be drivingly connected to the flywheel, a pilot means on the rearward surface of said first clutch portion, a second clutch portion drivingly connected to said first clutch portion and spaced rearwardly therefrom, a driven hub disposed axially between said first and second clutch portions with the forward end of said hub engaging said pilot means, and resilient means acting between said hub and said second clutch portion for biasing said hub into piloting engagement with said pilot means.

10. A clutch according to claim 9 wherein said pilot means comprises an annular bore in a rearward portion of said first clutch portion said annular bore defining an annular shoulder, and the forward end of said clutch driven hub is received in said annular bore with said annular shoulder pilotingly engaging the periphery of said hub.

11. A clutch according to claim 10 wherein said resilient means is an annular spring washer including therein means for allowing lubricant to flow radially thereby.

12. A claim according to claim 11 wherein said annular spring washer is a wave washer.

13. A clutch according to claim 11 wherein said clutch driven hub has a forward end face and has radially extending lubricant passages formed in said forward end face.

14. A clutch according to claim 10 wherein said annular bore has an abutting surface formed in the front end of said bore, the forward end of said hub engages said abutting surface and said forward end of said clutch driven hub has a plurality of circumferentially spaced radially extending passages therein.

15. In a multiple disc oil cooled and lubricated clutch including a clutch cover, a disc pack disposed within said cover with some members of the pack drivingly connected to said clutch cover and other members of said pack drivingly connected to a driven clutch hub, the latter being adapted for driving connection to a transmission input shaft, means for engaging said disc pack and passage means for conducting fluid into and out of said clutch cover for cooling and lubricating the contents thereof, the improvement comprising a piloting bore formed in said clutch cover adjacent to said clutch hub, the adjacent end of said clutch hub being abuttingly received in said piloting bore and containing radially extending lubricant grooves in the abutting end of said hub, a piloting groove formed in the end of said hub opposite to said abutting end of said hub, and a wave washer disposed in said piloting groove and compressed between said hub and a portion of said clutch cover axially spaced from said piloting bore for biasing said hub into piloting engagement with said piloting bore.

16. A clutch according to claim 6 wherein said clutch driven hub has axially extending lubricant passages formed therethrough confluently connecting the rear side of said hub to said radially extending lubricant passage means.

17. A clutch according to claim 7 wherein said clutch driven hub has a splined bore and a splined periphery, and a plurality of axially extending passages extend through said hub between said splined bore and said splined periphery and confluently connect the input side of said hub to said radially extending lubricant passages, there being one axial passage for each of said radially extending passages.

18. A clutch according to claim 7 wherein said clutch driven hub has axially extending lubricant passages formed therethrough confluently connecting the rear side of said hub to said radially extending passage means.

19. A clutch according to claim 13 wherein said clutch driven hub has axially extending lubricant passages formed therethrough confluently connecting the rear side of said hub to the radially extending passages formed in said forward end face.

* * * * *